US011044050B2

(12) United States Patent
Kim

(10) Patent No.: US 11,044,050 B2
(45) Date of Patent: Jun. 22, 2021

(54) TRANSMISSION DEVICE AND METHOD OF OPERATING SAME

(71) Applicant: SK TELECOM CO., LTD., Seoul (KR)

(72) Inventor: Kang Ho Kim, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 36 days.

(21) Appl. No.: 16/540,203

(22) Filed: Aug. 14, 2019

(65) Prior Publication Data

US 2020/0059320 A1 Feb. 20, 2020

(30) Foreign Application Priority Data

Aug. 16, 2018 (KR) ................. 10-2018-0095649

(51) Int. Cl.
*H04L 1/08* (2006.01)
*H04L 1/00* (2006.01)
*H04W 72/04* (2009.01)

(52) U.S. Cl.
CPC ............. *H04L 1/08* (2013.01); *H04L 1/0035* (2013.01); *H04W 72/042* (2013.01); *H04W 72/0446* (2013.01)

(58) Field of Classification Search
CPC ...... H04L 1/08; H04L 1/0035; H04W 72/042; H04W 72/0446
See application file for complete search history.

(56) References Cited

U.S. PATENT DOCUMENTS

| 9,408,251 | B2* | 8/2016 | Grady ................. H04L 67/12 |
| 2015/0249525 | A1* | 9/2015 | Liu .................... H04W 74/006 370/329 |
| 2016/0218836 | A1* | 7/2016 | Yamamoto ........... H04L 1/1671 |
| 2017/0027011 | A1* | 1/2017 | Chae .................. H04W 52/245 |
| 2017/0086081 | A1* | 3/2017 | Kim .................... H04W 4/027 |
| 2017/0303248 | A1* | 10/2017 | Chatterjee .......... H04W 72/042 |
| 2018/0270795 | A1* | 9/2018 | Morioka ................ H04L 1/08 |
| 2018/0278371 | A1* | 9/2018 | Chien ................. H04L 1/0009 |
| 2018/0288746 | A1* | 10/2018 | Zhang ................. H04L 1/0031 |
| 2018/0309544 | A1* | 10/2018 | Hwang ............... H04L 1/1887 |
| 2018/0337752 | A1* | 11/2018 | Choi ..................... H04B 7/26 |
| 2019/0182715 | A1* | 6/2019 | Urabayashi ........ H04W 28/20 |
| 2019/0393988 | A1* | 12/2019 | Bae ..................... H04L 1/1812 |
| 2020/0008223 | A1* | 1/2020 | Yang .................. H04W 48/14 |
| 2020/0028630 | A1* | 1/2020 | Beale ................... H04L 1/188 |
| 2020/0037350 | A1* | 1/2020 | Park .................... H04L 1/1861 |
| 2020/0052827 | A1* | 2/2020 | Vilaipornsawai ......... H04L 5/10 |

(Continued)

FOREIGN PATENT DOCUMENTS

KR 10-2017-0044187 A 4/2017
KR 10-2017-0062492 A 6/2017

OTHER PUBLICATIONS

Korean Office Action dated Jan. 9, 2020 corresponding to Korean Application No. 10-2018-0095649 with english translation.

*Primary Examiner* — Kyle Vallecillo
(74) *Attorney, Agent, or Firm* — Hauptman Ham, LLP

(57) ABSTRACT

Proposed are a transmission device and a method of operating the same for stopping (ending) data transmission even though a predetermined number of repetitions, that is, Repetition Level (RL) repetitions remain when a reception device succeeds in data decoding while data is transmitted through a repetitive data transmission operation.

17 Claims, 9 Drawing Sheets

(56) References Cited

U.S. PATENT DOCUMENTS

| | | | |
|---|---|---|---|
| 2020/0059322 A1* | 2/2020 | Lei | H04L 1/1867 |
| 2020/0092044 A1* | 3/2020 | Park | H04W 28/04 |
| 2020/0092858 A1* | 3/2020 | Ye | H04L 1/1861 |
| 2020/0213062 A1* | 7/2020 | Sato | H04W 52/02 |
| 2020/0213980 A1* | 7/2020 | Takeda | H04L 1/00 |
| 2020/0252955 A1* | 8/2020 | Takeda | H04W 72/12 |
| 2020/0287663 A1* | 9/2020 | Chen | H04W 76/30 |
| 2021/0006365 A1* | 1/2021 | Kalhan | G16Y 40/35 |
| 2021/0014008 A1* | 1/2021 | Takeda | H04W 72/042 |
| 2021/0037537 A1* | 2/2021 | Stathakis | H04W 72/0446 |

* cited by examiner

FIG. 2

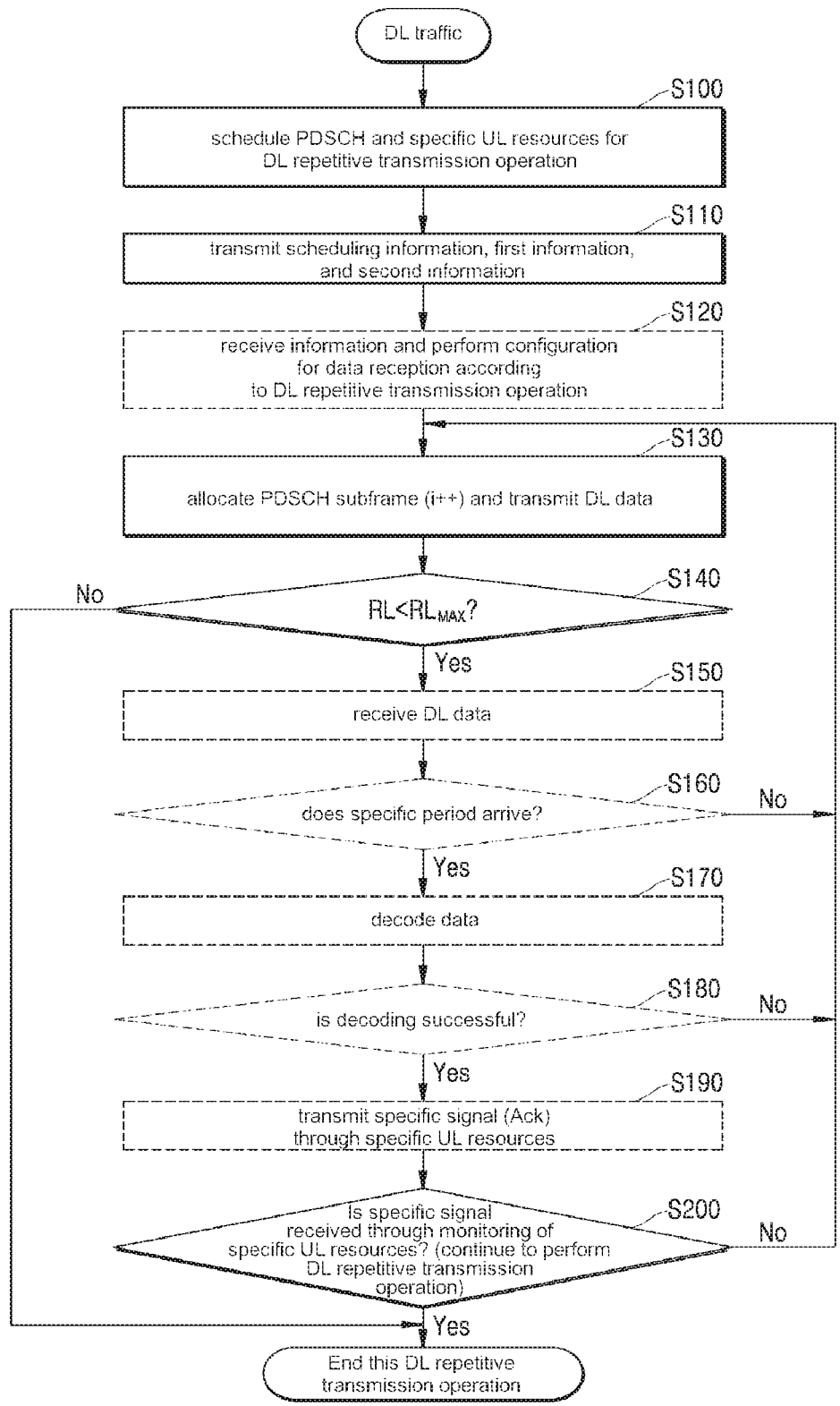

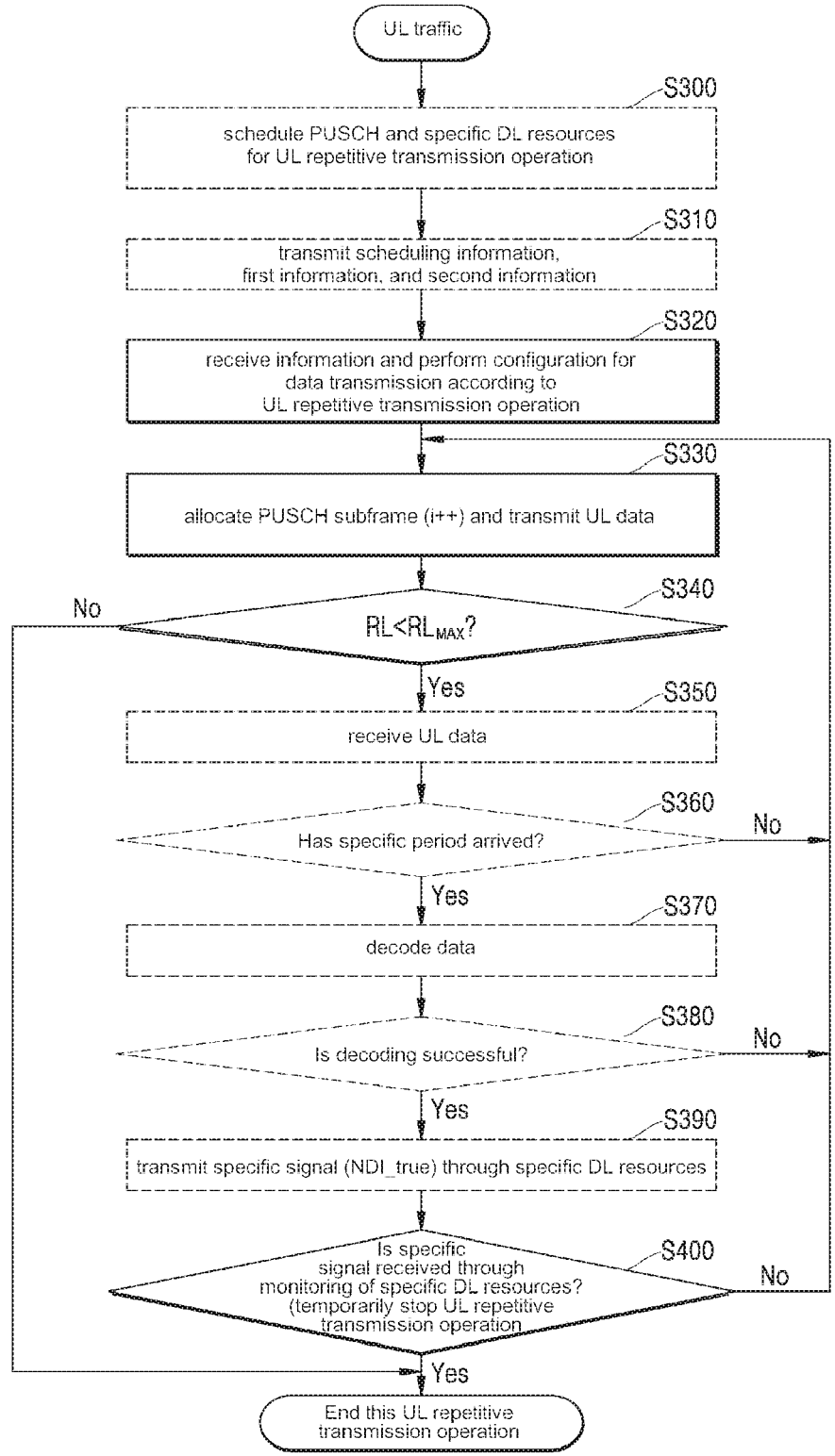

TRANSMISSION DEVICE AND METHOD OF OPERATING SAME

CROSS-REFERENCE TO RELATED APPLICATIONS

The instant application is based on and claims priority to Korean Patent Application No. 10-2018-0095649, filed on Aug. 16, 2018. The disclosure of above-listed application is hereby incorporated by reference herein in their entirety.

BACKGROUND OF THE INVENTION

1. Field of the Invention

The present disclosure relates to a Machine-Type Communication (MTC) technology.

The present disclosure relates to a transmission device for overcoming the inefficiency of a repetitive transmission scheme used to expand radio coverage in MTC and a method of operating the same.

2. Description of the Prior Art

As a technology of the Internet of Things (IoT) evolves, various Low-Power Wide-Area-Network (LPWAN) technologies have appeared.

The 3GPP defines enhanced Machine-Type Communication (eMTC), which is an LTE-based MTC technology.

The eMTC has wider radio coverage compared to conventional LTE and thus has Coverage Enhancement (CE) for enabling services even in a poor electric field condition and in a shade area.

As a representative technology used for eMTC, particularly CE, there is a repetitive transmission scheme.

The eMTC supports the repetition scheme for continuously and repeatedly transmitting the same data to each of various physical channels, such as PRACH/PUCCH/MPDCCH/PUSCH/PDSCH.

At this time, the number of times the same data is repeatedly transmitted in the repetition scheme is determined by a CE mode and a CE level defined in standards.

According to the repetition scheme, a transmission device continuously and repeatedly transmits the same data to a reception device a predetermined number of times, and thus the amount of energy per symbol increases. As a result, it is possible to obtain an expansion effect of widening radio coverage of the reception device (for example, an MTC User Equipment (UE)) compared to conventional LTE.

Meanwhile, network resource is excessively occupied for continuous and repeated transmission of the same data due to the repetition scheme, a problem occurs in that system throughput is reduced.

As a result, the currently defined repetition scheme has a trade-off relationship between coverage increase and throughput reduction.

Accordingly, the present disclosure proposes a method of overcoming the inefficiency of the trade-off relationship between the coverage increase and the throughput reduction in the conventional repetition scheme.

SUMMARY OF THE INVENTION

The present disclosure has been devised to solve the above problem and realize a method (technology) for overcoming the inefficiency of the trade-off relationship between the coverage increase and throughput reduction in the conventional repetition scheme.

In accordance with an aspect of the present disclosure, a transmission device is provided. The transmission device includes: a repetitive transmission unit configured to perform a repetitive data transmission operation to a specific reception device a preset number of times; a signal reception identification unit configured to identify whether a specific signal is received from the specific reception device before the repetitive data transmission operation is completed, the specific signal indicating that the data is sucessfully received by the specific reception device; and a controller configured to end the repetitive data transmission operation when reception of the specific signal is identified.

Specifically, when the transmission device is a Base Station (BS), the transmission device may further include an information provision unit configured to provide first information related to a specific number of repetitive transmission and second information related to a specific period for attempting transmission of the specific signal to the specific reception device.

Specifically, the information provision unit may transmit the first information and the second information through a specific downlink channel using a resource block within a Physical Downlink Shared Channel (PDSCH).

Specifically, the signal reception identification unit may identify whether the specific signal is received in specific uplink resource pre-allocated to the specific reception device.

Specifically, the specific UL resources may be a subframe within a Physical Uplink Control Channel (PUSCH), a location of the subrame being determined based on each subframe corresponding to the specific period among subframes of a PDSCH successively allocated for the repetitive data transmission operation.

Specifically, when the transmission device is a User Equipment (UE), the transmission device may further include an information reception unit configured to receive first information related to a specific number of repetitive transmission and second information related to a specific period for attempting transmission of the specific signal.

Specifically, the signal reception identification unit may identify whether the specific signal is received in specific downlink resource pre-allocated in connection with the specific reception device.

Specifically, the specific downlink resources may be a subframe predefined within a specific downlink channel using a resource block of a PDSCH, a location of the subframe being determined based on each subframe corresponding to the specific period among subframes of a PUSCH successively allocated for the repetitive data transmission operation.

Specifically, the specific reception device may decode the data at every specific period and identify whether the data is successfully received while receiving the data according to the repetitive data transmission operation, and transmit the specific signal through the specific uplink resource or the specific downlink resource when it is identified that the data is successfully received.

Specifically, the specific reception device may decode the data at every specific period and identify whether the data is successfully received while receiving the data according to the repetitive data transmission operation, and transmit the specific signal through the specific uplink resource or the specific downlink resource when it is identified that the data is successfully received.

Specifically, when the transmission device is a UE, the repetitive transmission unit may temporarily stop the repetitive data transmission operation while the signal reception identification unit identifies whether the specific signal is received.

In accordance with another aspect of the present disclosure, a method of operating a transmission device is provided. The method includes: performing a repetitive data transmission operation to a specific reception device a preset specific number of times; identifying whether a specific signal is received from the specific reception device before the repetitive data transmission operation is completed, the specific signal indicating that the data is sucessfully received by the specific reception device; and ending the repetitive data transmission operation when reception of the specific signal is identified.

Specifically, when the transmission device is a Base Station (BS), the method may further include providing first information related to a specific number of repetitive transmission and second information related to a specific period for attempting transmission of the specific signal to the specific reception device.

Specifically, the signal reception identification step may identify whether the specific signal is received in specific uplink resource pre-allocated to the specific reception device.

Specifically, the specific uplink resource may be a subframe within a Physical Uplink Control Channel (PUCCH), a location of the subrame being determined based on each subframe corresponding to the specific period among subframes of a PDSCH successively allocated for the repetitive data transmission operation.

Specifically, when the transmission device is a User Equipment (UE), the method may further include receiving first information related to a specific number of repetitive transmission and second information related to a specific period for attempting transmission of the specific signal.

Specifically, the signal reception identification step may identify whether the specific signal is received in specific downlink resource pre-allocated in connection with the specific reception device.

Specifically, the specific downlink resource may be a subframe predefined within a specific downlink channel using a resource block of a PDSCH, a location of the subframe being determined based on each subframe corresponding to the specific period among subframes of a PUSCH successively allocated for the repetitive data transmission operation.

Specifically, when the transmission device is a UE, the repetitive transmission step may temporarily stop the repetitive data transmission operation while it is identified whether the specific signal is received.

A transmission device and a method of operating the same according to the present disclosure can obtain an effect of realizing a coverage increase while maintaining throughput by realizing a new scheme for overcoming the inefficiency of the trade-off relationship between the coverage increase and throughput reduction in the conventional repetition scheme.

BRIEF DESCRIPTION OF THE DRAWINGS

The above and other aspects, features and advantages of the present disclosure will be more apparent from the following detailed description taken in conjunction with the accompanying drawings, in which:

FIG. 2 illustrates an example of DL scheduling according to the conventional repetition scheme;

FIGS. 7 to 9 are flowcharts illustrating a method of operating a transmission device according to an embodiment of the present disclosure.

DETAILED DESCRIPTION OF THE EXEMPLARY EMBODIMENTS

Figure 1:
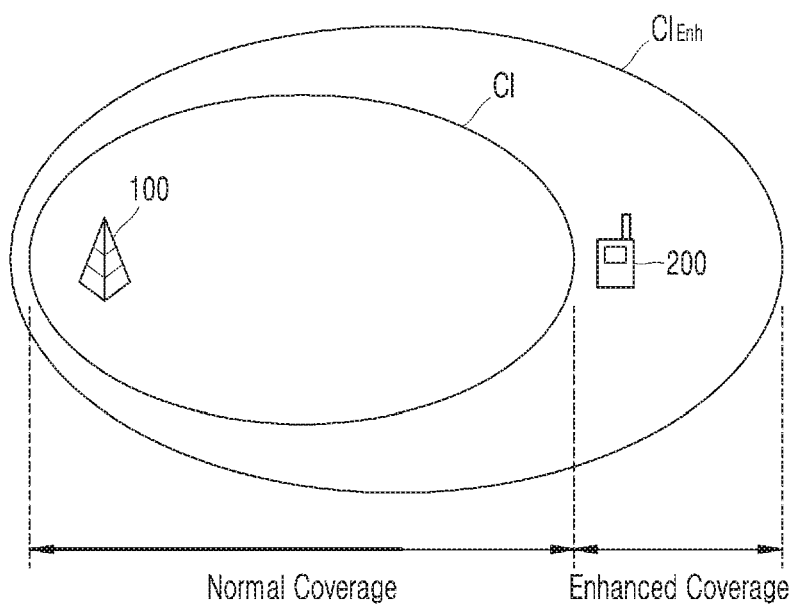
FIG. 1 illustrates an example of widening the coverage through a repetition scheme.

Technical terms used herein are used merely for illustrating specific embodiments, and it is to be noted that they are not intended to limit technical spirit disclosed in this specification. Also, the technical terms used herein are to be construed by the meanings normally accepted by the person having ordinary skill in the relevant art, unless specifically defined by other meanings in this specification, and it is neither to be construed by excessively comprehensive meanings nor excessively narrow meanings. Also, when the technical terms used herein are determined to be wrong technical terms which fail to represent the technical spirit disclosed in this specification correctly, the terms are to be replaced by the technical terms which can be accurately understood by the person having ordinary skill in the art. Also, the general terms used in this specification are to be construed as defined in the dictionaries or according to context, and they are not to be construed in an excessively narrow meaning.

Also, the singular representation used in this specification includes plural representations unless it is clearly expressed in the context to the contrary. The terms "include" or "is composed of" in this specification are not to be construed to necessarily include all components and all steps cited in this specification, and it should be construed to exclude some components or some steps or further include additional components and steps.

Also, the terms representing an ordinal number such as first, second, etc. used in this specification can be used to explain various components, however, the components are not to be limited by these terms. These terms are used only for discriminate one component from other components. For example, the first component can be entitled as a second component, and similarly, the second component can be entitled as the first component, without departing from the technical scope of the present disclosure.

In the following, embodiments disclosed in this specification are to be described in detail by referring to the appended figures, wherein the same reference numerals are given to the same or like components irrespective of the number of the figures, and duplicate description on them will be omitted.

Also, when it is determined that a detailed description on a relevant known art will obscure the subject matter disclosed in the specification while describing the technologies disclosed in this specification, the detailed description will be omitted. Also, it is to be noted that the appended figures are only for facilitating the technical spirit disclosed in this specification and the technical spirit are not to be construed to be limited by the appended figures.

Hereinafter, embodiments of the present disclosure will be described with reference to the accompanying drawings.

Recently, a 3GPP defines enhanced Machine-Type Communication (eMTC), which is an LTE-based MTC technology.

The eMTC has wider radio coverage than conventional LTE and thus has Coverage Enhancement (CE) for enabling services even in a poor electric field condition and in a shade area.

As a representative technology used for eMTC, particularly CE, there is a repetitive transmission scheme.

Accordingly, the eMTC supports the repetition scheme for continuously and repeatedly transmitting the same data to each of various physical channels such as PRACH/PUCCH/MPDCCH/PUSCH/PDSCH.

At this time, the number of times the same data is repeatedly transmitted in the repetition scheme is determined by a CE mode and a CE level defined in standards.

FIG. 1 illustrates an example of an increase in coverage by the repetition scheme.

That is, as illustrated in FIG. 1, according to the repetition scheme, a transmission device, for example, a Base Station (BS) 100, may continuously and repeatedly transmit the same data to a reception device, for example, an MTC UE 200, by a predetermined number of repetitions, and thus the amount of energy per symbol may increase. As a result, it is possible to obtain an effect of increasing coverage of the MTC UE 200 from C1 to C1 Enh compared to conventional LTE.

For reference, the repetition scheme is a completely separate concept from HARQ used in conventional LTE. HARQ is an operation on a MAC layer, which is an L2 layer, and the repetition scheme is a technology on a physical layer, which is an L1 layer.

On the other hand, network resource is excessively occupied to continuously and repeatedly transmit the same data according to the repetition scheme, a side effect of reducing system throughout results.

The reason of throughput reduction is described simply below.

In the repetition scheme, the number of repetitions is determined by a probabilistic value to satisfy a target Block Error Rate (BLER). There is the possibility of successful decoding of received data by the reception device (hereinafter, referred to as the possibility of early success) before transmission reaches the number of repetitions.

However, the conventional repetition scheme does not consider the possibility of early success, and thus, even though the reception device succeeds in decoding received data, the transmission device continuously transmits the data for the remaining number of repetitions.

Figure 2:
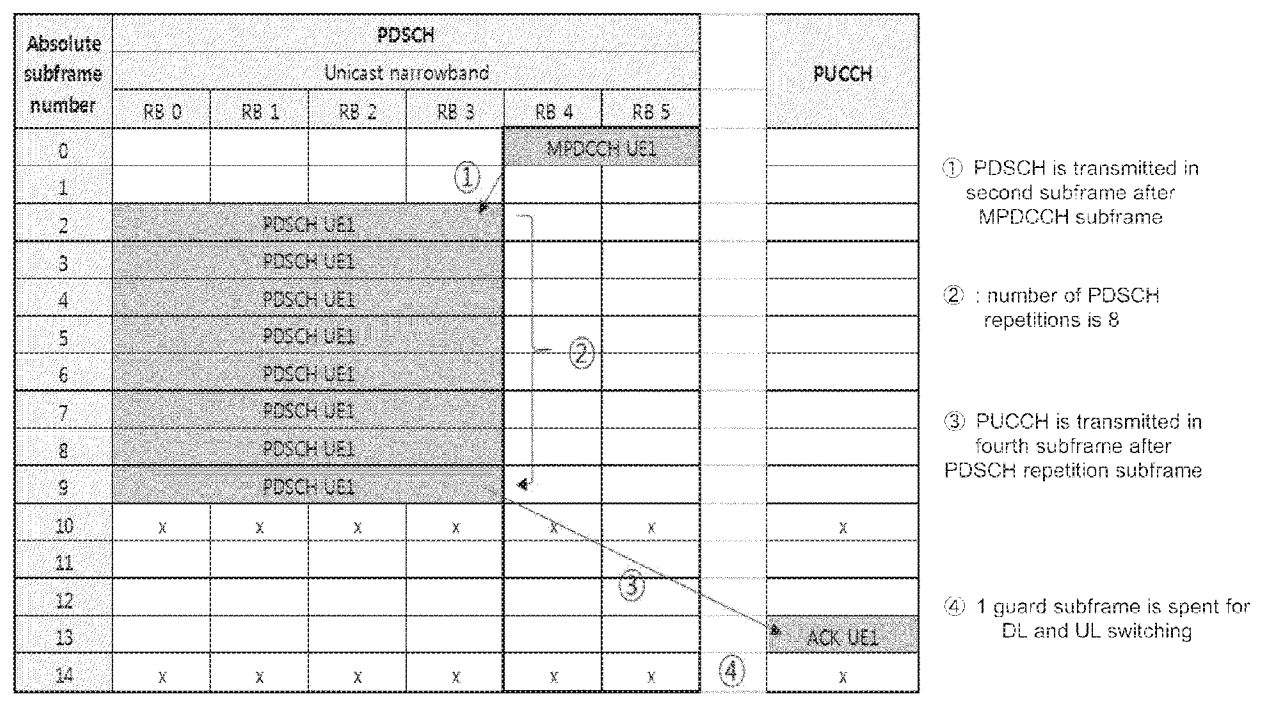

FIG. 2 illustrates an example of DL scheduling according to the conventional repetition scheme.

In FIG. 2, it is assumed that the number of repetitions (or Repetition Level (RL)) is determined as 8.

Meanwhile, the eMTC recommends the MTC UE to operate a half-duplex manner. Accordingly, resources for DL and UL are not simultaneously allocated to the MTC UE, and a guard time of 1 TTI is needed when switching between DL and UL.

As illustrated in FIG. 2, a BS 100 corresponding to the transmission device in DL transmits scheduling information of DL resources (PDSCH) allocated for the DL repetitive data transmission operation to a UE 200 (for example, UE1) through an MPDCCH ($\hat{1}$).

Thereafter, the BS 100 continuously and repeatedly transmits the same DL data at the RL (eight times) to the UE 200 (for example, UE1) using the allocated DL resources (PDSCH). That is, each of eight consecutive subframes within the PDSCH is used to transmit the same DL data when the number of repetitions (RL) is eight times ($\hat{2}$)).

Here, a subframe between transmission starts $\hat{1}$ and $\hat{2}$ follows TTIs (2 TTIs in FIG. 2) defined to start PDSCH transmission after the MPDCCH according to the standard of the eMTC.

The UE 200 (for example, UE1) receives DL data in the last (eighth) PDSCH subframe according to the DL repetitive data transmission operation on the basis of scheduling information previously received through the MPDCCH and then transmits an Ack signal to the BS 100 through the PUCCH after TTIs (4 TTIs in FIG. 2) defined to start PUCCH transmission after the DL repetitive data transmission operation according to the standard of the eMTC ($\hat{3}$).

Referring to FIG. 2, the UE 200 (for example, UE1) continuously receiving the same DL data may successfully decode the DL data received before the time point at which the DL data is received in the third PDSCH subframe (early success).

However, the conventional repetition scheme does not consider the possibility of early success, and thus, even though the UE 200 (for example, UE1) succeeds in decoding at the third PDSCH subframe where the DL data is received, the BS 100 continues to transmit the DL data the remaining number of times (5 times) among the predetermined RL (8 times).

As described above, the currently (conventionally) defined repetition scheme has a trade-off relationship between the coverage increase and the throughput.

Accordingly, the present disclosure proposes a method of achieving a coverage increase while maintaining throughput by overcoming the inefficiency of the trade-off relationship between the coverage increase and throughput in the conventional repetition scheme.

More specifically, when the reception device succeeds in decoding of the data while the transmission device transmits the data through the repetitive data transmission operation, it is proposed that a new method of stopping (terminating) repetitive transmission of the data in consideration of the possibility of early success even though a predetermined number of repetitions corresponding to a Repetition Level (RL) remains.

More specifically, a transmission device capable of implementing the method proposed by the present disclosure will be described.

Figure 3:
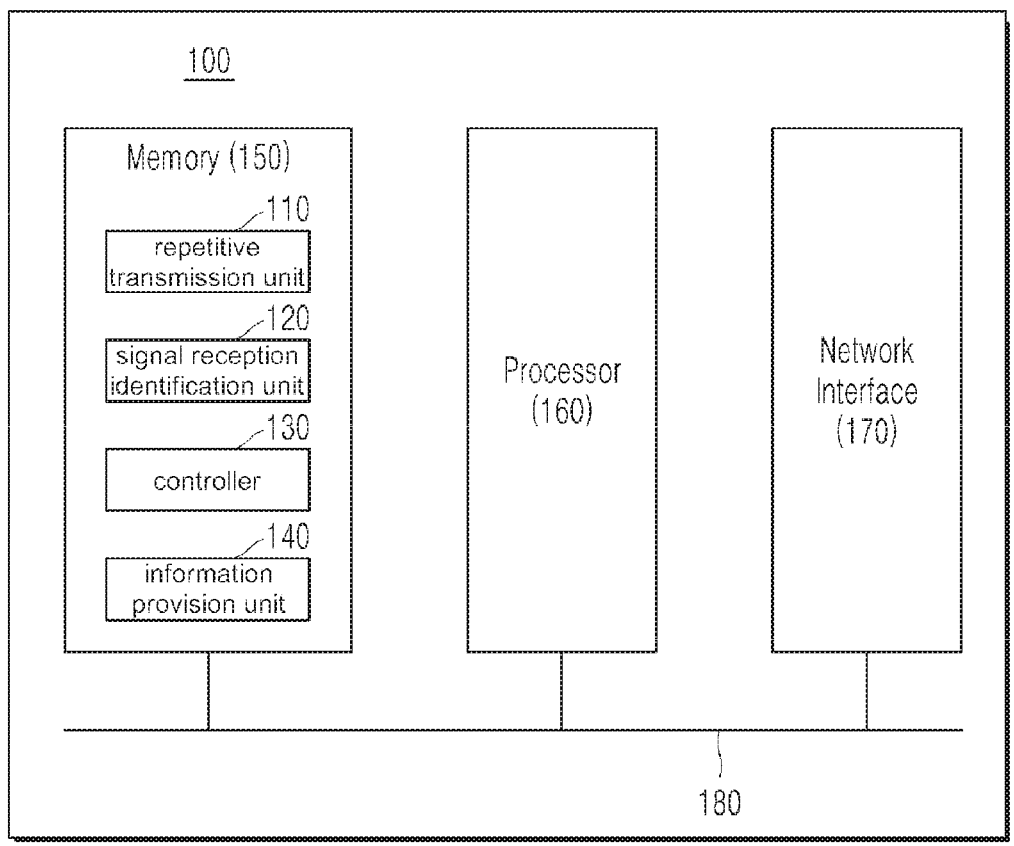
FIG. 3 is a block diagram schematically illustrating a transmission device according to an embodiment of the present disclosure.
Figure 4:
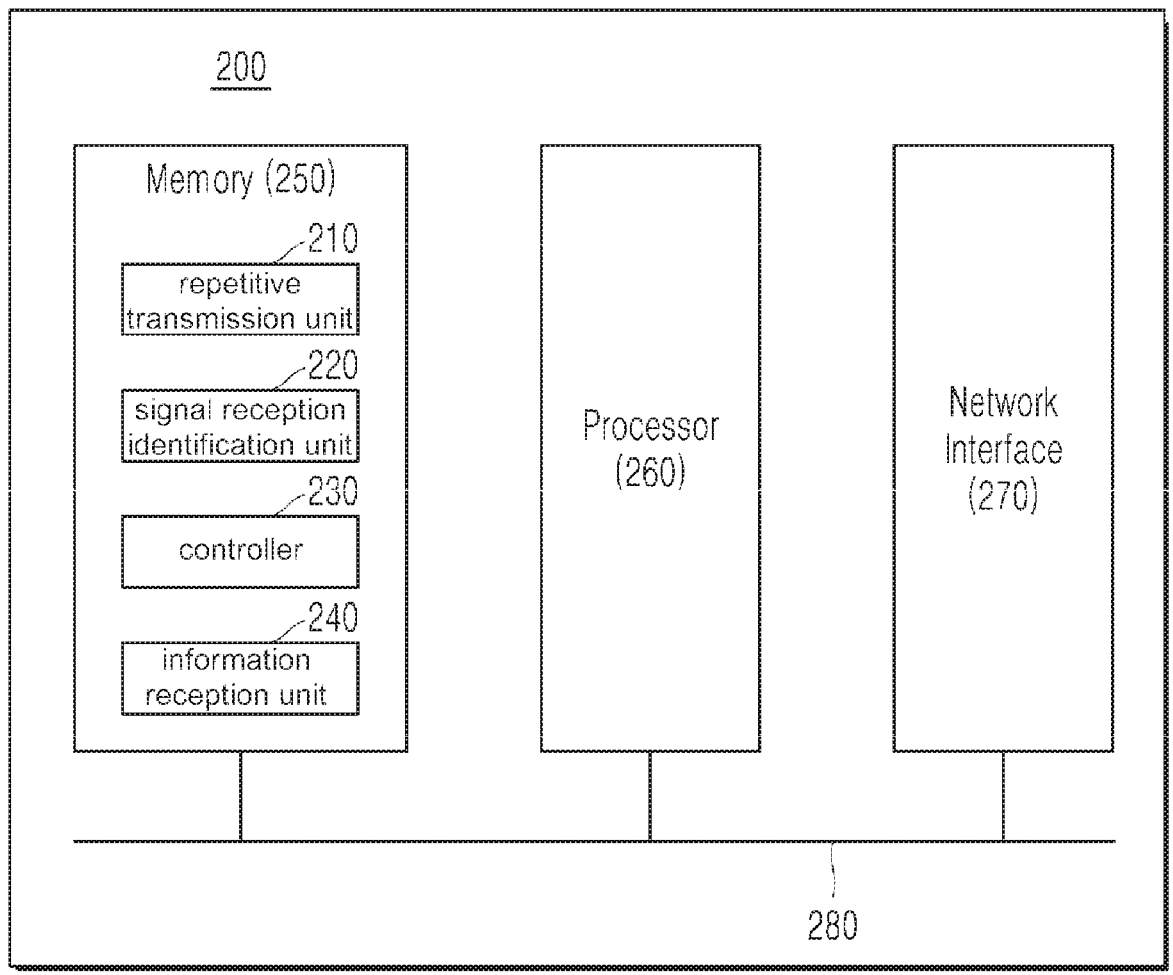
FIG. 4 is a block diagram schematically illustrating a transmission device according to an embodiment of the present disclosure.

Hereinafter, a transmission device according to various embodiments of the present disclosure will be described in detail with reference to FIGS. 3 and 4.

In the present disclosure, the BS 100 corresponds to the transmission device in DL and the UE 200 corresponds to the transmission device in UL.

Accordingly, the transmission device 100 (hereinafter, referred to as the BS 100) is first described from the aspect of DL with reference to FIG. 3.

The BS 100 according to an embodiment of the present disclosure may include a repetitive transmission unit 110, a signal reception identification unit 120, and a controller 130.

The BS 100 according to an embodiment of the present disclosure may further include an information provision unit 140.

All or at least some of the configurations of the BS 100 may be implemented in the form of a hardware module, a software module, or a combination of a hardware module and a software module.

The software module may be embodied as, for example, an instruction executed by a processor for controlling calculations within the BS 100, and the instruction may have a form installed in a memory within the BS 100.

As a result, the BS 100 according to an embodiment of the present disclosure implements a new method (hereinafter, referred to as a repetitive transmission control technology) proposed by the present disclosure through the aforementioned configuration, and hereinafter, each element within the BS 100 for implementing the new method will be described in more detail.

The repetitive transmission unit 110 performs a repetitive data transmission operation for repeatedly transmitting the same data to a specific reception device a preset number of times.

Hereinafter, for convenience of description, the UE 200 (for example, MTC UE) is described as the specific reception device, and a DL repetitive data transmission operation is described from the aspect of DL.

The repetitive transmission unit 110 performs the DL repetitive data transmission operation of repeatedly transmitting the same data to a specific reception device, that is, the UE 200, a preset number of times, that is, a number of repetitions (hereinafter, RL).

In the present disclosure, like the conventional art, the number of repetitions (RL) for the DL repetitive data transmission operation is determined according to a CE mode, a CE level, and a target BLER predefined in the system.

Further, in the present disclosure, the BS 100 may allocate not only DL resources (PDSCH) for the DL repetitive data transmission operation on the basis of a predetermined (preset) RL but also specific uplink (UL) resources for receiving a specific signal described below during the DL repetitive data transmission operation.

The specific UL resources for receiving the specific signal will be described below in detail.

Meanwhile, in the eMTC, the BS operates in a full-duplex manner, unlike the UE, which operates in a half-duplex manner, and thus can simultaneously perform DL and UL transmission/reception.

Accordingly, in the present disclosure, there is a difference between scheduling (PDSCH, specific UL resources) for the DL repetitive data transmission operation and scheduling (PUSCH, specific DL resources) for the UL repetitive data transmission operation.

The difference will be described below, and the description will continue from the aspect of DL.

The information provision unit 140 provides a specific reception device, that is, the UE 200, with first information related to the a specific number of times, that is, a previously determined (set) RL and second information related to a specific period at which transmission of a specific signal is attempted.

Specifically, the information provision unit 140 may transmit scheduling information of the PDSCH and specific UL resources previously allocated for the DL repetitive data transmission operation to the UE 200 through a specific downlink channel (hereinafter, referred to as a specific DL channel) using a resource block within the Physical Downlink Shared Channel (PDSCH), and also transmits the first information and the second information.

At this time, the specific DL channel may be an MPDCCH.

That is, the information provision unit 140 may transmit scheduling information of the PDSCH and specific UL resources allocated for the DL repetitive data transmission operation, the first information, and the second information to the UE 200 through the MPDCCH, particularly, a Data Channel Indicator (DCI) of the MPDCCH.

Accordingly, the UE 200 may configure information required for receiving data according to the DL repetitive data transmission operation on the basis of the information received through the MPDCCH.

After the information provision unit 140 transmits the information, the repetitive transmission unit 110 may perform the DL repetitive data transmission operation of repeatedly transmitting the same data for the DL traffic of the UE 200 a preset (predetermined) number of times according to RL.

The signal reception identification unit 120 identifies whether a specific signal indicating success of data reception from the UE 200 is received before transmission a specific number of times equal to RL is completed during the DL repetitive data transmission operation.

Specifically, the signal reception identification unit 120 may identify whether the specific signal is received in specific UL resources pre-allocated to the UE 200 during a scheduling process for the DL repetitive data transmission operation.

The specific UL resources may be subframes at specific locations predefined within a Physical Uplink Control Channel (PUCCH) based on respective subframes corresponding to a specific period among subframes of the PDSCH successively allocated for the DL repetitive data transmission operation.

Figure 5:
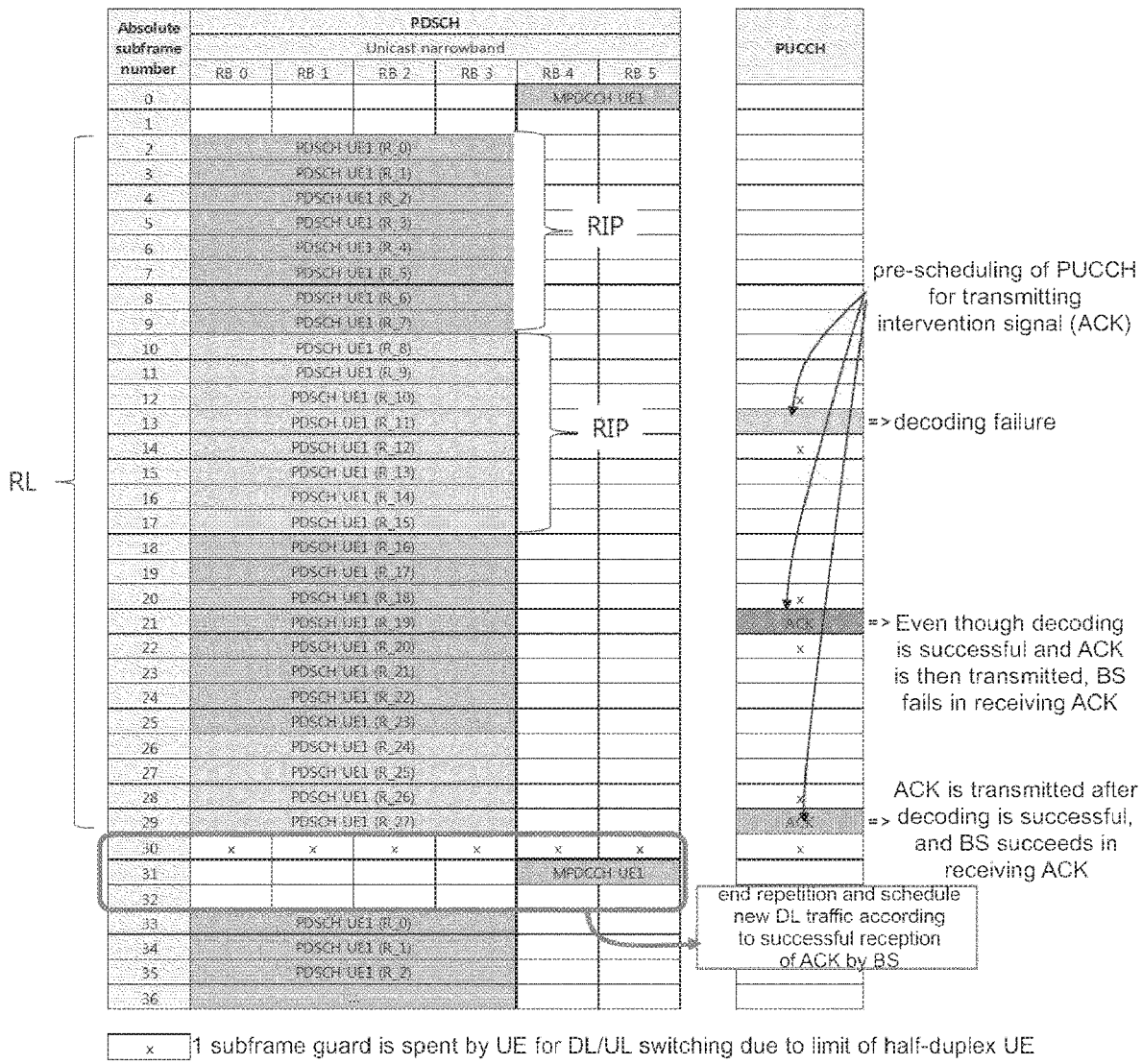
FIG. 5 illustrates an example of scheduling for a DL repetitive data transmission operation according to an embodiment of the present disclosure.

FIG. 5 illustrates an example of scheduling for the DL repetitive data transmission operation according to the present disclosure.

In FIG. 5, it is assumed that the number of repetitions (RL) is 64 and that a specific period (Repetition Intervention Period (RIP)) is 8 TTIs.

Referring to FIG. 5, in the present disclosure, the BS 100 may allocate as specific UL resources for respective subframes at specific locations predefined within the PUCCH based on respective subframes (9, 17,25 , , , 65). The respective subframes (9, 17,25 , , , 65) correspond to a specific period (8 TTIs) among 64 subframes (2 to 65) within the PDSCH successively allocated for the DL repetitive data transmission operation.

For example, according to the current standard of the eMTC, PUCCH transmission is defined to start 4 TTIs after the DL repetitive data transmission operation.

In FIG. 5, illustrating an embodiment according to the current standard of the eMTC, the BS 100 may allocate specific UL resources for respective subframes (13, 21, 29 , , , 69) corresponding to locations after 4 TTIs within the PUCCH based on respective subframes (9,17,25 , , , 65) corresponding to a specific period (8 TTIs) among 64 consecutive subframes (2 to 65) within the PDSCH.

That is, the BS 100 allocates specific UL resources respective for subframes (13, 21, 29 , , , 69) within the PUCCH corresponding to locations of "integer multiple+4" of the RIP (8) during a process of allocating/scheduling 64 consecutive subframes (2 to 65) within the PDSCH.

When there is change in the current standard defining to start PUCCH transmission 4 TTIs after PDSCH transmission, the locations to which specific UL resources are allocated can also be controlled according to the change.

As illustrated in FIG. 5, the BS 100 operates in a full-duplex manner and thus may continuously perform the DL repetitive data transmission operation without stopping the DL repetitive data transmission operation since DL resources within the PDSCH can be allocated even at the location (time) to which specific UL resources are allocated to receive a specific signal.

In FIG. 5, the repetitive transmission unit 110 performs the DL repetitive data transmission operation for repeatedly transmitting the same data to the UE 200 (for example, UE1) RL times (64 times) through each of 64 consecutive subframes within the allocated PDSCH.

In this case, the signal reception identification unit 120 may identify whether a specific signal is received in specific UL resources, that is, each subframe (13, 21,29 , , , 69) within the PUCCH pre-allocated to the UE 200.

The UE 200 decodes received data and identifies whether reception is successful on a specific period configured to attempt transmission of the specific signal while the UE 200 receives data from the transmission device 100 (BS) according to the DL repetitive data transmission operation.

As described above, the UE 200 may configure information required for receiving data according to the DL repetitive data transmission operation on the basis of the information received through the MPDCCH, that is, the scheduling information of the PDSCH and specific UL resources, the first information (RL), and the second information (specific period).

Particularly, the UE 200 may configure information for processing decoding of the data received up to that time at every specific period on the basis of information received through the MPDCCH.

Referring to FIG. 5 (RL=64, RIP=8), the UE 200 according to the present disclosure receives data through each subframe within the PDSCH allocated for the DL repetitive operation. And the UE 200 according to the present disclosure determines that a specific period has arrived when the number of received subframes is the same as an integer multiple of a specific period (8 TTIs) and processes decoding of data received up to that time.

When the data received up to that time is successfully decoded, the UE 200 may identify that reception is successful and transmit a specific signal, for example, an Ack signal, to the BS 100 through pre-allocated specific UL resources. The pre-allocated specific UL resources is specific UL resources (subframe) within the PUCCH closest to the time point at which reception success is identified.

When reception of the specific signal is identified before RL transmissions are completed during the DL repetitive data transmission operation, the controller 130 terminates the DL repetitive data transmission operation being performed.

When reception of the specific signal is identified before RL transmissions are completed during the DL repetitive data transmission operation, the UE 200 succeeds in data decoding while the BS 100 transmits the data through the DL repetitive data transmission operation.

As a result, when the UE 200 succeeds in data decoding while the BS 100 transmits the data through the DL repetitive data transmission operation, the controller 130 stops (terminates) data transmission even though a number of repetitions corresponding to RL remains.

A scenario of the DL repetitive data transmission operation is described by way of example with reference to FIG. 5 (RL=64, RIP=8).

Since the RL is 64, the BS 100 repeatedly transmits data 64 times.

At this time, since the specific period (RIP) is 8, the LIE 200 (UE1) decodes data at every eighth time that data is received.

When decoding is successful, the UE 200 (UE1) transmits Ack in specific UL resources (specific location within the PUCCH) previously allocated by the BS 100.

In FIG. 5, it is assumed that the UE 200 (UE1) fails in decoding in the first RIP but succeeds in decoding in the second RIP and that the BS 100 does not normally receive Ack transmitted when the UE 200 (UE1) succeeds in decoding.

Accordingly, the BS 100 continuously and repeatedly transmits data according to the DL repetitive data transmission operation, and the UE 200 (UE1) may retransmit Ack in the third RIP.

When the BS 100 normally receives Ack that the UE 200 (UE1) transmits in the third RIP, the BS 100 ends the DL repetitive data transmission operation to thus stop the repetitive transmission. Then the BS 100 performs scheduling of new UL or DL traffic for new repetitive data transmission operation, and allocates the MPDCCH.

Meanwhile, when the BS 100 fails in receiving ACK from the UE 200 (UE1) until all 64 data transmissions of the DL repetitive data transmission operation are completed, the BS 100 operates on the basis of a scenario which is the same as the conventional repetition scheme.

As a result, even in the worst case, in which the BS fails in receiving ACK from the UE 200 (UE1) until all 64 data transmissions of the DL repetitive data transmission operation are completed, efficiency at the level of the conventional repetition scheme can still be secured.

As described above, the BS 100, which is the transmission device according to an embodiment of the present disclosure, may include a memory 150, a processor 160, a network interface 170, and a bus for connecting the same. The memory 150, the processor 160, and the network interface 170 may be implemented as a hardware component such as a combination of a circuits, or as a hardware component and software or firmware. The memory 150 stores instructions to be executed by the processor 160. Specifically, the memory 150 stores the repetitive transmission unit 110, the signal reception identification unit 120, the controller 130, and the information provision unit 140, among different software components, and performs the repetitive transmission control technology of the present disclosure. The repetitive transmission unit 110, the signal reception identification unit 120, the controller 130, and the information provision unit 140 may be implemented as separate circuits.

Hereinafter, the transmission device 200 (hereinafter, the UE 200) will be described from the aspect of UL with reference to FIG. 4.

The UE 200 according to an embodiment of the present disclosure may include a repetitive transmission unit 210, a signal reception identification unit 220, and a controller 230.

The UE 200 according to an embodiment of the present disclosure may further include an information reception unit 240.

All or at least sonic of the elements of the UE 200 may be implemented in the form of a hardware module, a software module, or a combination of a hardware module and a software module.

The software module may be construed as, for example, an instruction executed by a processor for controlling calculations within the UE 200, and the instruction may take the form of being installed in a memory within the UE 200.

As a result, the UE 200 according to an embodiment of the present disclosure implements a new method (hereinafter, referred to as the repetitive transmission control technology) proposed by the present disclosure through the aforementioned configuration, and hereinafter, each element within the UE 200 implementing the method will be described in more detail.

The repetitive transmission unit 210 performs a repetitive data transmission operation for repeatedly transmitting the same data to a specific reception device a preset number of times.

Hereinafter, for convenience of description, the BS 100 is described as a specific reception device, and a UL repetitive data transmission operation is described from the aspect of UL.

The repetitive transmission unit 210 performs the UL repetitive data transmission operation for repeatedly transmitting the same data to a specific reception device, that is, the BS 100, a preset number of times, that is, a number of repetitions (hereinafter, RL).

In the present disclosure, like the conventional art, the number of repetitions (RL) for the UL repetitive data transmission operation is determined according to a CE mode, a CE level, and a target BLER predefined in the system.

Further, in the present disclosure, the BS 100 may allocate not only UL resources (PUSCH) for the UL repetitive data transmission operation on the basis of the predetermined (preset) RL but also specific downlink (DL) resources for receiving a specific signal described below during the UL repetitive data transmission operation.

The specific DL resources for receiving the specific signal will be described below in detail.

Meanwhile, in the eMTC, the MTC UE operates in a half-duplex manner, and thus cannot simultaneously perform DL and UL transmission/reception.

Accordingly, in the present disclosure, there is a difference between scheduling (PDSCH, specific UL resources) for the UL repetitive data transmission operation described above and scheduling (PUSCH, specific DL resources) for the UL repetitive data transmission operation described below. Hereinafter, the description continues from the viewpoint of UL.

As in DL, the BS 100 may transmit scheduling information of a PUSCH and specific DL resources previously allocated for the UL repetitive data transmission operation, first information related to a specific number of times, that is, the previously determined (set) RL, and second information related to a specific period for attempting transmission of a specific signal to the UE 200 through an MPDCCH, particularly, a DCI of the MPDCCH.

The information reception unit 240 may receive the scheduling information of the PUSCH and the specific DL resources allocated for the UL repetitive data transmission operation, the first information, and the second information through an MPDCCH, particularly, a DCI of the MPDCCH.

The UE 200 may configure information required for transmitting data according to the UL repetitive data transmission operation on the basis of the information received through the MPDCCH.

Particularly, the UE 200 may configure information for performing the DL repetitive data transmission operation for repeatedly transmitting the same data a preset (predetermined) number of times equal to RL on the basis of the information received through the MPDCCH.

The repetitive transmission unit 210 may perform the UL repetitive data transmission operation for repeatedly transmitting the same data for UL traffic of the UE 200 a preset (predetermined) number of times corresponding to RL after receiving information through the information reception unit 240.

The repetitive transmission unit 210, from the aspect of UL, temporarily stops the UL repetitive data transmission operation while the signal reception identification unit 220 identifies whether a specific signal is received.

The signal reception identification unit 220 identifies whether a specific signal, indicating success of data reception from the BS 100 before a specific number, that is, RL transmissions are completed during the UL repetitive data transmission operation, is received.

Specifically, the signal reception identification unit 220 may identify whether the specific signal is received in specific UL resources pre-allocated in connection with the BS 100 during a scheduling process for the UL repetitive data transmission operation.

The specific DL resources may be subframes at specific locations predefined within a specific downlink channel using a resource block of the PDSCH, that is, an MPDCCH based on respective subframes after a specific period among the subframes of the PUSCH successively allocated in units of specific periods for the UL repetitive data transmission operation.

Figure 6:
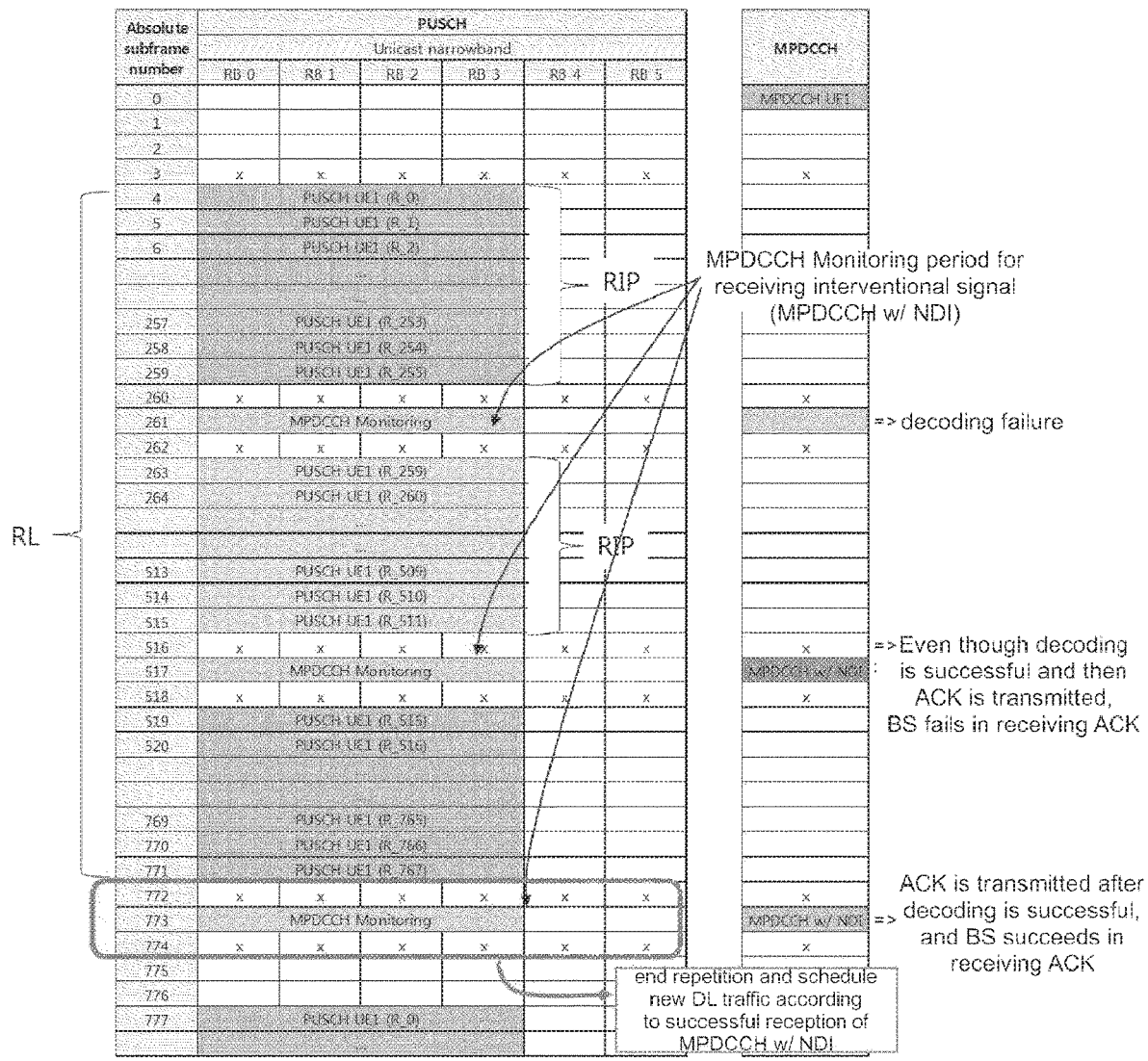
FIG. 6 illustrates an example of scheduling for a UL repetitive data transmission operation according to an embodiment of the present disclosure.

FIG. 6 illustrates an example of scheduling for the UL repetitive data transmission operation in the present disclosure.

In FIG. 6, it is assumed that the number of repetitions (RL) is 1024 and that a specific period (RIP) is 256 TTIs.

Referring to FIG. 6, the BS 100 according to the present disclosure may allocate specific DL resources for respective subframes at specific locations predefined within the MPDCCH based on respective subframes (259, 515 , , , ) corresponding to a specific period (256 TTIs) among 1024 subframes (4 to 259, 263 to 515, and 519~) within the PUSCH successively allocated in units of specific periods (RIP) for the UL repetitive data transmission operation.

For example, according to the current standard of the eMTC, the UE 200 operates in a half-duplex manner, and thus cannot simultaneously perform DL/UL reception/transmission, and a guard time of 1 TTI is needed for DL/UL switching.

In FIG. 6, illustrating an embodiment according to the current standard of the eMTC, the BS 100 according to the present disclosure may allocate specific UL resources for respective subframes (261, 517, , ,) within the PUCCH at locations corresponding to a guard time of 1 TTI based on respective subframes (259, 519, , ,) corresponding to the specific period (256 TTIs) among the 1024 consecutive subframes (4 to 259, 263 to 515, and 519~) within the PDSCH.

Accordingly, in FIG. 6, the signal reception identification unit 220 may identify whether the specific signal is received in specific DL resources pre-allocated in connection with the BS 100, that is, respective subframes (261, 517, , ,) within the MPDCCH allocated by the BS 100.

Further, as illustrated in FIG. 6, since the UE 200 operating in a half-duplex manner cannot simultaneously perform DL/UL reception/transmission, the BS 100 according to the present disclosure may not allocate UL resources for the UL repetitive data transmission operation at the location (time) to which specific DL resources are allocated, and may also not allocate UL resources for the UL repetitive data transmission operation in the guard time of 1 TTI right before/after the location of specific DL resources.

Accordingly, as illustrated in FIG. 6, since UL resources within the PUSCH are not allocated while the signal reception identification unit 220 identifies whether the specific signal is received in specific DL resources, that is, respective subframes (261, 517, , ,) within the MPDCCH, the repetitive transmission unit 210 temporarily stops the UL repetitive data transmission operation.

In FIG. 6, the repetitive transmission unit 210 performs the UL repetitive data transmission operation for repeatedly transmitting the same data to the UE 200 (for example, UE1) RL times (1024 times) through each of the 1024 consecutive subframes (4 to 259, 263 to 515, and 519~) within the allocated PDSCH.

The BS 100 decodes the received data at every specific period configured to attempt transmission of the specific signal and identifies whether reception is successful while receiving the data according to the UL repetitive data transmission operation from the transmission device 200 (UE).

As described above, the BS 100 is aware of the scheduling information of the PUSCH and the specific DL resources allocated to the UE 200 for the UL repetitive data transmission operation, the first information (RL), and the second information (specific period).

The BS 100 may configure information for processing decoding of data received up to that time at every specific period on the basis of the information.

Referring to FIG. 6 (RL=1024, RIP=256), the BS 100 according to the present disclosure receives data through each subframe within the PUSCH allocated for the UL repetitive operation, and when the number of received subframes is the same as an integer multiple of a specific period (256 TTIs), determines that a specific period arrives and processes decoding of data received up to that time.

When the data received up to that time is successfully decoded, the BS 100 may identify that reception is successful, and may transmit a specific signal, for example, a CDI having New Data. Indicator (NDI) toggle set as true, to the UE 200 through pre-allocated specific DL resources, that is, specific L resources (subframe) within the MPDCCH closest to the time point at which success of reception is identified.

When reception of the specific signal is identified before RL transmissions are completed during the UL repetitive data transmission operation, the controller 230 ends the UL repetitive data transmission operation being performed.

When reception of the specific signal is identified before RL transmissions are completed during the UL repetitive data transmission operation, the BS 100 succeeds in data decoding while the UE 200 transmits the data through the UL repetitive data transmission operation.

As a result, when the BS 100 succeeds in data decoding while the UE 200 transmits the data through the UL repetitive data transmission operation, the controller 230 stops (terminates) data transmission even though some repetitions, that is, RL repetitions remain.

A scenario of the UL repetitive data transmission operation will be described by way of example with reference to FIG. 6 (RL=1024, RIP=256).

Since the RL is 1024, the UE 200 (UE1) repeatedly transmits data a total number of times corresponding to 1024.

At this time, since the specific period (RIP) is 256, the BS 100 decodes data every 256 time that data is received. When decoding is successful, the BS 100 transmits a specific signal, that is, NDI_true, at specific DL resources (a specific location within the MPDCCH) allocated in advance.

In FIG. 6, it is assumed that the BS 100 fails in decoding in the first RIP but succeeds in decoding in the second RIP and that the UE 200 (UE1) does not normally receive NDI_true which is transmitted when the BS 100 succeeds in decoding.

Accordingly, the UE 200 (UE1) continuously and repeatedly transmits data according to the UL repetitive data transmission operation, and the BS 100 may retransmit NDI_true in the third RIP.

When the UE 200 (UE1) normally receives NDI_true which the BS 100 transmits in the third RIP, the UE 200 (UE1) ends the UL repetitive data transmission operation to thus stop the repetitive transmission, and the BS 100 performs scheduling for new repetitive data transmission operation for new UL or DL traffic and allocates the MPDCCH.

Even though the UE 200 fails in receiving NDI_true from the BS 100 until all of the 1024 data transmissions of the DL repetitive data transmission operation are completed, the UE 200 operates according to a scenario which is the same as the conventional repetition scheme.

As a result, even in the worst case, in which the UE fails in receiving NDI_true from the BS 100 until all 1024 data transmissions of the DL repetitive data transmission operation are completed, efficiency at the level of the conventional repetition scheme can still be secured.

As described above, the UE 200, which is the transmission device according to an embodiment of the present disclosure, may include a memory 250, a processor 260, a network interface 270, and a bus 280 for connecting the same. The memory 250, the processor 260, and the network interface 270 may be implemented as hardware components such as a combination of a circuit or a hardware component and software or firmware. The memory 250 stores instructions executed by the processor 260. Specifically, the memory 250 stores the repetitive transmission unit 210, the signal reception identification unit 220, the controller 230, and the information reception unit 240, among different software components, and performs the repetitive transmission control technology of the present disclosure. The repetitive transmission unit 210, the signal reception identification unit 220, the controller 230, and the information reception unit 240 may be implemented as separate circuits.

As described above, the present disclosure implements a new type of repetitive transmission control technology (repetition control technology) capable of stopping (terminating) data transmission even though the predetermined number of repetitions, that is, RL repetitions remain when the reception device succeeds in data decoding while the transmission device transmits data through the repetitive data transmission operation.

Accordingly, the repetition control technology of the present disclosure can derive an effect of achieving a coverage increase while maintaining throughput by overcoming the inefficiency of the trade-off relationship between the coverage increase and the throughput in the conventional repetition scheme.

Hereinafter, a method of operating the transmission device according to an embodiment of the present disclosure will be described.

Figure 7:
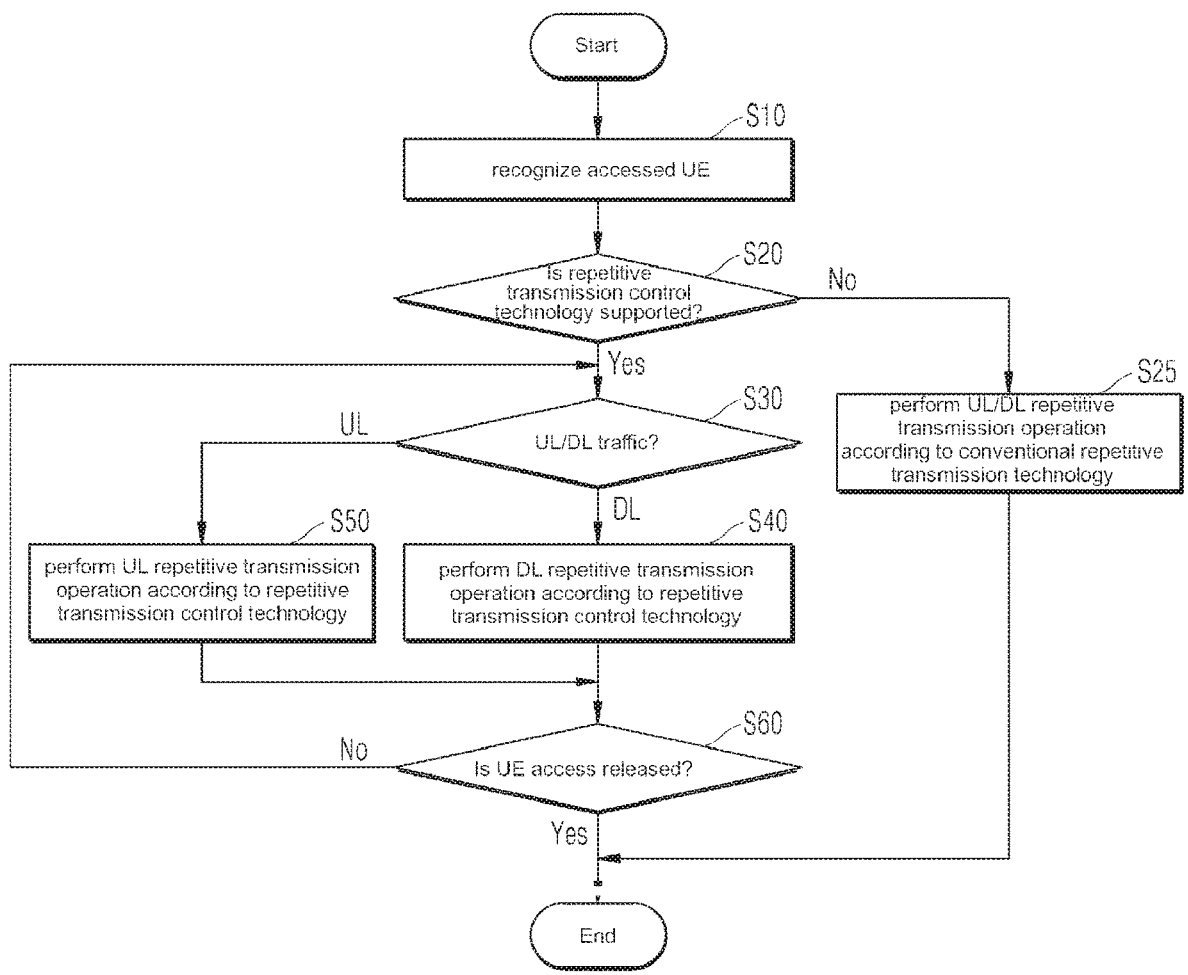

The method of operating the transmission device according to an embodiment of the present disclosure is described with reference to FIGS. 7 to 9.

First, the overall operation flow of the method of operating the transmission device according to an embodiment of the present disclosure is described with reference to FIG. 7.

In the method of operating the transmission device according to an embodiment of the present disclosure, when the accessed UE 200 is recognized in S10, the BS 100 identifies whether the UE is a UE supporting the repetitive transmission control technology (repetition control technology) of the present disclosure in S20.

For example, in an attach process, the UE 200 transmits a UE capability information message with an "RIP-support" field set to 1 or 0.

If the corresponding field has nothing, the BS 100 recognizes 0. If the corresponding field is 1, the BS 100 may identify that the UE 200 supports the repetition control technology.

In the method of operating the transmission device according to an embodiment of the present disclosure, when it is identified that the accessed UE 200 does not support the repetition control technology of the present disclosure (No in S20), the BS 100 may perform a UL/DL repetitive data transmission operation with the UE 200 according to the conventional repetition scheme in S25.

Meanwhile, in the method of operating the transmission device according to an embodiment of the present disclosure, when it is identified that the accessed UE 200 supports the repetition control technology of the present disclosure (Yes in S20) and the access of the UE 200 is not disconnected (No in S60), the BS 100 may distinguish UL/DL traffics for the UE 200 in S30, perform the DL repetitive data transmission operation with the UE 200 according to the repetition control technology of the present disclosure for DL traffic in S40, and may perform the UL repetitive data transmission operation with the UE 200 according to the repetition control technology of the present disclosure for UL traffic in S50.

Hereinafter, in the method of operating the transmission device according to an embodiment of the present disclosure, the process of performing the DL repetitive data transmission operation according to the repetition control technology will be described with reference to FIG. 8.

Since the BS 100 corresponds to the transmission device in the case of DL, the BS 100 is hereinafter described as the transmission device in the present disclosure.

In the present disclosure, like the conventional art, the number of repetitions (RL) for the DL repetitive data transmission operation is first determined according to a CE mode, a CE level, and a target BLER predefined in the system.

In the method of operating the transmission device according to an embodiment of the present disclosure, the BS 100 performs scheduling for allocating DL resources (PDSCH) for the DL repetitive data transmission operation on the basis of the predetermined (preset) RL and allocating specific UL resources for receiving a specific signal described below during the DL repetitive data transmission operation in S100.

In the method of operating the transmission device according to an embodiment of the present disclosure, the BS 100 may transmit scheduling information of the PDSCH and specific UL resources allocated for the DL repetitive data transmission operation, first information related to the RL, and second information related to a specific period to the UE 200 through an MPDCCH, particularly, a Data Channel Indicator (DCI) of the MPDCCH in S110.

The UE 200 may configure information required for receiving data according to the DL repetitive data transmission operation on the basis of the information received through the MPDCCH, that is, the scheduling information of the PDSCH and the specific UL resources, the first information (RL), and the second information (specific period) in S130.

Particularly, the UE 200 may configure information for processing decoding of the data received up to that time at every specific period on the basis of information received through the MPDCCH.

In the method of operating the transmission device according to an embodiment of the present disclosure, after transmitting the information through the MPDCCH, the BS 100 may perform the DL repetitive data transmission operation for repeatedly transmitting the same data to DL traffic of the UE 200 a preset (predetermined) number of times equal to RL in S130 and S140.

FIG. 5 illustrates an example of scheduling for the DL repetitive data transmission operation according to the present disclosure.

In FIG. 5, it is assumed that the number of repetitions (RL) is 64 and that a specific period (Repetition Intervention Period (RIP)) is 8 TTIs.

Referring to FIG. 5, in the method of operating the transmission device according to an embodiment of the present disclosure, the BS 100 transmits data to the UE 200 using the current subframe (i) within the PDSCH in S130, and when the number of transmissions up to that time does not reach RLMAX (64) (Yes in S140), repeats the process of transmitting the data to the UE 200 using the next subframe (i++) within the PDSCH in S130.

Accordingly, in the method of operating the transmission device according to an embodiment of the present disclosure, the BS 100 may perform the DL repetitive data transmission operation for repeatedly transmitting the same data RL times (64 times) to the UE 200 using 64 consecutive subframes (2 to 64) within the PDSCH.

Meanwhile, the UE 200 decodes the received data at every specific period (RIP) configured to attempt transmission of the specific signal and identifies whether reception is successful in S160 and S170 while receiving the data according to the DL repetitive data transmission operation from the transmission device 100 (BS) in S150.

Referring to FIG. 5 ((RL=64, RIP=8), the UE 200 according to the present disclosure receives data through each subframe within the PDSCH allocated for the DL repetitive operation in S150, and when the number of received subframes becomes the same as an integer multiple of a specific period (8 TTIs), determines that a specific period has arrived (Yes in F160) and processes decoding of data received up to that time in S170.

When the data received up to that time is successfully decoded, the UE 200 may identify that reception is successful (Yes in S180), and may transmit a specific signal, for example, an Ack signal, to the BS 100 through pre-allocated specific UL resources, that is, specific UL resources (subframes) within the PUCCH closest to the time point at which reception success is identified in S190.

In the method of operating the transmission device according to an embodiment of the present disclosure, before transmissions corresponding to the number of repetitions (RL=64) are completed (Yes in S140), the BS 100 may identify whether the specific signal (Ack) is received in specific UL resources pre-allocated to the UE 200, that is, respective subframes (13, 21,29 , , , 69) within the PUCCH in S200.

As illustrated in FIG. 5, the BS 100 operates in a full-duplex manner and thus may continuously perform the DL repetitive data transmission operation without stopping the DL repetitive data transmission operation since DL resources within the PDSCH can be allocated for the location (time) at which specific UL resources are allocated to receive the specific signal.

In the method of operating the transmission device according to an embodiment of the present disclosure, when the specific signal (Ack) is received (Yes in S200), the BS 100 ends this DL repetitive data transmission operation by stopping data transmission even though the number of repetitions, that is, RL repetitions remain.

Hereinafter, in the method of operating the transmission device according to an embodiment of the present disclosure, a process of performing the UL repetitive data transmission operation according to the repetition control technology will be described in detail with reference to FIG. 9.

Since the UE 200 corresponds to the transmission device in the case of UL, the UE 200 is hereinafter described as the transmission device of the present disclosure.

In the present disclosure, like the conventional art, the number of repetitions (RL) for the UL repetitive data transmission operation is first determined according to a CE mode, a CE level, and a target BLER predefined in the system.

The BS 100 performs scheduling for allocating UL resources (PUSCH) for the UL repetitive data transmission operation on the basis of the predetermined (preset) RL and allocating specific DL resources for receiving a specific signal described below during the UL repetitive data transmission operation in S300.

The BS 100 may transmit scheduling information of the PUSCH and specific DL resources allocated for the UL repetitive data transmission operation, first information related to the RL, and second information related to a specific period to the UE 200 through an MPDCCH, particularly, a Data Channel Indicator (DCI) of the MPDCCH, in S310.

The UE 200 may configure information required for receiving data according to the UL repetitive data transmission operation on the basis of the information received through the MPDCCH, that is, the scheduling information of the PUSCH and the specific DL resources, the first information (RL), and the second information (specific period) in S320.

Particularly, the UE 200 may configure information for performing the DL repetitive data transmission operation for repeatedly transmitting the same data at the preset (predetermined) RL on the basis of the information received through the MPDCCH.

In the method of operating the transmission device according to an embodiment of the present disclosure, after receiving information through the MPDCCH, the UE 200 may perform the UL repetitive data transmission operation for repeatedly transmitting the same data for UL traffic of the UE 200 a preset (predetermined) number of times equal to RL in S330 and S340.

FIG. 6 illustrates an example of scheduling for the UL repetitive data transmission operation in the present disclosure.

In FIG. 6, it is assumed that the number of repetitions (RL) is 1024 and that a specific period (RIP) is 256 TTIs.

Referring to FIG. 6, in the method of operating the transmission device according to an embodiment of the present disclosure, the UE 200 transmits data to the BS 100 using the current subframe (i) within the PUSCH in S330, and when the number of transmissions up to that time does not reach RLMAX (1024) (Yes in S340), repeats the process of transmitting the data to the BS 100 using the next subframe (i++) within the PUSCH in S330.

In the method of operating the transmission device according to an embodiment of the present disclosure, the UE 200 may perform the UL repetitive data transmission operation for repeatedly transmitting the same data RL times (1024 times) to the BS 100 using 1024 subframes (4 to 259, 263 to 515, and 519~) within the PUSCH.

Meanwhile, the BS 100 decodes the received data at every specific period (RIP) configured to attempt transmission of a specific signal and identifies whether reception is successful in S360 and S370 while the BS 100 receives data according to the UL repetitive data transmission operation from the transmission device 200 (UE) in S350.

Referring to FIG. 6 (RL=1024, RIP=256), the BS 100 according to the present disclosure receives data through each subframe within the PUSCH allocated for the UL repetitive operation in S350, and when the number of received subframes is the same as an integer multiple of a specific period (256 TTIs), determines that a specific period has arrived (Yes in S360) and processes decoding of data received up to that time in S370.

When the data received up to that time is successfully decoded, the BS 100 may identify that reception is successful (Yes in S380), and transmit a specific signal, for example, NDI_true, to the UE 200 through pre-allocated specific DL resources, that is, specific DL resources (subframe) within the PUCCH closest to the time point at which reception success is identified in S390.

In the method of operating the transmission device according to an embodiment of the present disclosure, before transmissions corresponding to the number of repetitions (RL=1024) are completed (Yes in S340), the UE 200 may identify whether the specific signal (NDI_true) is received in pre-allocated specific DL resources, that is, respective subframes (261, 517 , , , ) within the MPDCCH in S400.

As illustrated in FIG. 6, the UE 200, operating in a half-duplex manner, cannot simultaneously perform DL/UL reception/transmission.

Accordingly, in the method of operating the transmission device according to an embodiment of the present disclosure, the UE 200 does not allocate UL resources within the PUSCH for the UL repetitive data transmission operation at the location (time) to which specific DL resources are allocated and in the guard time of 1 TTI immediately before/after the location even at the location (time) at which specific UL resources for receiving the specific signal are allocated.

Therefore, as illustrated in FIG. 6, in the method of operating the transmission device according to an embodiment of the present disclosure, since UL resources within the PUSCH are not allocated while it is identified whether the specific signal is received in specific DL resources, that is, respective subframes (261, 517 , , , ) within the MPDCCH, the UE 200 temporarily stops the UL repetitive data transmission operation.

In the method of operating the transmission device according to an embodiment of the present disclosure, when the specific signal (NDI_true) is received (Yes in S400), the BS 100 ends this UL repetitive data transmission operation by stopping data transmission even though the number of repetitions, that is, RL repetitions remain.

As described above, the present disclosure implements a new type of repetitive transmission control technology (repetition control technology) capable of stopping (terminating) data transmission even though a predetermined number of repetitions, that is, RL repetitions remain when the reception device succeeds in data decoding while the transmission device transmits data through the repetitive data transmission operation.

Accordingly, the repetition control technology of the present disclosure can derive an effect of achieving a coverage increase while maintaining throughput by overcoming the inefficiency of the trade-off relationship between the coverage increase and throughput in the conventional repetition scheme.

Meanwhile, the realized articles of functional operations and subject matters described in this specification can be implemented using digital electronic circuits, or implemented as computer software, firmware, or hardware including the configuration disclosed in this specification and structural equivalents thereof, or as a combination be at least one of these implementations. The articles of realization of the subject matter described in this specification can be implemented as one or more computer program product, that is, one or more module related to computer program instructions which are encoded on a tangible program storage medium for controlling the operation of the process system or for being executed by the same.

The computer-readable medium can be a machine-readable storage device, a machine-readable storage board, a memory device, a composition of materials affecting machine-readable wave signals, and a combination of at least one of them.

The such as "a system" or "a device" in this specification encompasses all tools, devices, and machines for processing data including, for example, a programmable processor, a computer, or a multi-processor. The process system can include a code for creating an execution atmosphere for the computer program, when requested by a code constituting a processor firmware, a protocol stack, a database management system, an operating system, or a combination of at least one of them, etc., in addition to a hardware.

The computer (also known as a program, a software, a software application, a script, or a code) can be created in all types of program languages including a compiled or interpreted language or a priori or procedural language, and can be arranged in all types including standalone programs, modules, subroutines, and other units proper to be used in a computing environment. The computer program does not necessarily correspond to a file of a file system. The program can be stored in a single file provided by the requested program, in multiple files which interact with each other (for example, files storing one or more module, low level programs or some of the code), or in a part of the file containing other programs or data (for example, one or more script stored in a markup language document). The computer program can be arranged to be positioned in one site or distributed over a plurality of sites, such that it can be executed on multiple computers interconnected via a communication network or on a single computer.

Meanwhile, the computer-readable medium which is proper for storing computer program instructions and data can include and all types of nonvolatile memories, media, and memory devices including a semiconductor memory device such as EPROM, EEPROM and flash memory device, a magnetic disk such as internal hard disk or removable disk, optical disk, a CD-ROM and a DVD-ROM disk. The processor and the memory can be supplemented by a special purpose logic circuit or integrated into the same.

The article of realization of the subject matter described in this specification can include a back-end component such as a data server, a middleware component such as an application server, or a front-end component such as a client computer having a web browser or a graphic user interface which enables a user to interact with the article of realization of the subject matter described in this specification, or can implement all combinations of these back-end, middleware, or front-endcomponents in a computing system. The components of a system can be interconnected with each other by all types or media of digital data communication such as a communication network.

Although this specification includes details of various specific implementations, it is not to be understood as limiting for all disclosures or scope to be claimed, and it should rather be understood as an explanation for the features which can be unique to specific implementations of the specific disclosure. Similarly, the specific features described in this specification in the context of separate implementations can be implemented to be combined in a single implementation. On the contrary, various features described in the context of the single implementation can also be implemented as discrete or proper low level combinations as well as in various implementations. Furthermore, although the features can be depicted as work in a specific combination and as claimed in the first place, one or more features from the claimed combination can be excluded from the combination in some cases, and the claimed combination can be changed to the low level combinations or subcombinations.

Also, although this specification depicts the operations in a specific order in the drawings, it is not to be understood that this specific sequence or order should be maintained or all the shown operations should be performed in order to obtain the preferred results In specific cases, multitasking and parallel processing can be preferable. Also, the division of various system components of the aforementioned embodiments are not to be construed as being required by all embodiments, and it is to be understood that the described program components and systems can generally be unified into a single software product or packaged in multiple software products.

Similarly, this specification is not intended to limit the present disclosure to specific terms provided. Therefore, although the present disclosure has been explained in detail by referring to the aforementioned examples, it is possible for the person having ordinary skill in the art to alter, change, or modify these examples without departing from the scope of the present disclosure. The scope of the present disclosure is expressed by the claims, not by the specification, and all changes and modified shapes derived from the meanings of the claims, scopes, and the equivalents thereof are construed to be included in the scope of the present disclosure.

What is claimed is:

1. A transmission device comprising:
   a repetitive transmission unit configured to perform a repetitive data transmission operation to a specific reception device a preset number of times;
   a signal reception identification unit configured to identify whether a specific signal is received from the specific reception device before the repetitive data transmission operation is completed, the specific signal indicating that data is successfully received by the specific reception device;
   a controller configured to end the repetitive data transmission operation when reception of the specific signal is identified; and
   an information provision unit configured to provide first information related to a specific number of repetitive transmission and second information related to a specific period for attempting transmission of the specific signal to the specific reception device.

2. The transmission device of claim 1, wherein the information provision unit transmits the first information and the second information through a specific downlink channel using a resource block within a Physical Downlink Shared Channel (PDSCH).

3. The transmission device of claim 1, wherein the signal reception identification unit identifies whether the specific signal is received in a specific uplink resource pre-allocated o the specific reception device.

4. The transmission device of claim 3, wherein the specific uplink resource is a subframe within a Physical Uplink Control Channel (PUCCH), a location of the subrame being determined based on each subframe corresponding to the specific period among subframes of a PDSCH successively allocated for the repetitive data transmission operation.

5. A transmission device comprising:
a repetitive transmission unit configured to perform a repetitive data transmission operation to a specific reception device a preset number of times;
a signal reception identification unit configured to identify whether a specific signal is received from the specific reception device before the repetitive data transmission operation is completed, the specific signal indicating that data is successfully received by the specific reception device;
a controller configured to end the repetitive data transmission operation when reception of the specific signal is identified; and
an information reception unit configured to receive first information related to a specific number of repetitive transmission and second information related to a specific period for attempting transmission of the specific signal.

6. The transmission device of claim 5, wherein the signal reception identification unit identifies whether the specific signal is received in a specific downlink resource pre-allocated in connection with the specific reception device.

7. The transmission device of claim 6, wherein the specific downlink resource is a subframe predefined within a specific downlink channel using a resource block of a PDSCH, a location of the subframe being determined based on each subframe corresponding to the specific period among subframes of a PUSCH successively allocated for the repetitive data transmission operation.

8. The transmission device of claim 3, wherein the specific reception device decodes the data at every specific period and identifies whether the data is successfully received while receiving the data according to the repetitive data transmission operation, and transmits the specific signal through the specific uplink resource or a specific downlink resource when it is identified that the data is successfully received.

9. The transmission device of claim 6, wherein the specific reception device decodes the data at every specific period and identifies whether the data is successfully received while receiving the data according to the repetitive data transmission operation, and transmits the specific signal through a specific uplink resource or the specific downlink resource when it is identified that the data is successfully received.

10. The transmission device of claim 5, wherein the repetitive transmission unit temporarily stops the repetitive data transmission operation while the signal reception identification unit identifies whether the specific signal is received.

11. A method of operating a transmission device, the method comprising:
performing a repetitive data transmission operation to a specific reception device a preset specific number of times;
identifying whether a specific signal is received from the specific reception device before the repetitive data transmission operation is completed, the specific signal indicating that data is successfully received by the specific reception device;
providing first information related to a specific number of repetitive transmission and second information related to a specific period for attempting transmission of the specific signal to the specific reception device; and
ending the repetitive data transmission operation when reception of the specific signal is identified.

12. The method of claim 11, wherein the identifying comprising:
identifying whether the specific signal is received in a specific uplink resource pre-allocated to the specific reception device.

13. The method of claim 12, wherein the specific uplink resource is a subframe within a Physical Uplink Control Channel (PUCCH), a location of the subframe being determined based on each subframe corresponding to the specific period among subframes of a PDSCH successively allocated for the repetitive data transmission operation.

14. A method of operating a transmission device, the method comprising:
performing a repetitive data transmission operation to a specific reception device a preset specific number of times;
identifying whether a specific signal is received from the specific reception device before the repetitive data transmission operation is completed, the specific signal indicating that the data is successfully received by the specific reception device;
receiving first information related to a specific number of repetitive transmission and second information related to a specific period for attempting transmission of the specific signal; and
ending the repetitive data transmission operation when reception of the specific signal is identified.

15. The method of claim 14, wherein the identifying comprises:
identifying whether the specific signal is received in a specific downlink resource pre-allocated in connection with the specific reception device.

16. The method of claim 15, wherein the specific downlink resource is a subframe predefined within a specific downlink channel using a resource block of a PDSCH, a location of the subframe being determined based on each subframe corresponding to the specific period among subframes of a PUSCH successively allocated for the repetitive data transmission operation.

17. The method of claim 16, wherein the performing comprising:
temporarily stopping the repetitive data transmission operation while it is identified whether the specific signal is received.

* * * * *